United States Patent
Ban et al.

[11] Patent Number: 5,839,773
[45] Date of Patent: Nov. 24, 1998

[54] ROLLING STOWABLE SEAT

[75] Inventors: Marcel Ban, Troy; Alan Sturt, W. Bloomfield, both of Mich.

[73] Assignee: Lear Corporation, Southfield, Mich.

[21] Appl. No.: 950,934

[22] Filed: Oct. 15, 1997

[51] Int. Cl.[6] ...................................................... B60N 2/36
[52] U.S. Cl. .................................. 296/65.09; 296/65.14; 297/15
[58] Field of Search ........................... 297/15; 296/65.05, 296/65.09, 65.13, 65.14

[56] References Cited

U.S. PATENT DOCUMENTS

| | | |
|---|---|---|
| 3,151,906 | 10/1964 | Roberts . |
| 3,746,389 | 7/1973 | Fourrey . |
| 4,341,415 | 7/1982 | Braun et al. . |
| 5,116,097 | 5/1992 | Bulgari . |
| 5,195,795 | 3/1993 | Cannera et al. ..................... 297/15 X |
| 5,280,987 | 1/1994 | Miller ................................... 296/65.1 |
| 5,348,261 | 9/1994 | Nini ...................................... 248/430 |
| 5,360,272 | 11/1994 | Schmale et al. ........................ 384/48 |
| 5,372,398 | 12/1994 | Aneiros et al. ....................... 296/65.1 |
| 5,398,995 | 3/1995 | Hurite ..................................... 297/378 |
| 5,482,346 | 1/1996 | Lesourd . |
| 5,492,386 | 2/1996 | Callum . |
| 5,527,087 | 6/1996 | Takeda et al. . |
| 5,570,931 | 11/1996 | Kargilis et al. ................. 296/65.09 X |
| 5,611,589 | 3/1997 | Fujii et al. . |

FOREIGN PATENT DOCUMENTS 2536349  5/1984  France .................................. 297/15

*Primary Examiner*—Peter R. Brown
*Attorney, Agent, or Firm*—Brooks & Kushman P.C.

[57] ABSTRACT

A vehicle seat that is folded and stowed in a recess in the floor of a vehicle. A rear portion of the seat has shiftable elements that are moved within channels formed in tracks. The shiftable elements may be rollers that move in box channel tracks. A front portion of the seat is supported by link arms that pivot as the seat is stowed in the recess. Locking pins on the link arms are received in a series of holes that permit fore and aft adjustment of the seat position.

6 Claims, 2 Drawing Sheets

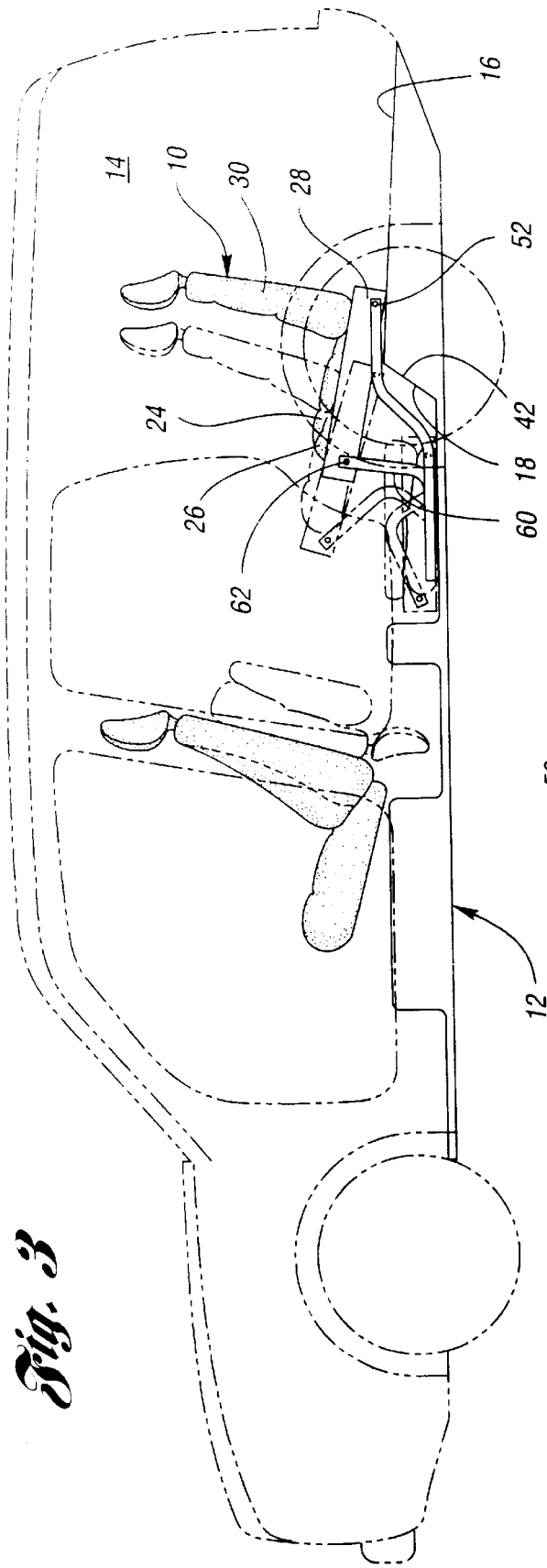
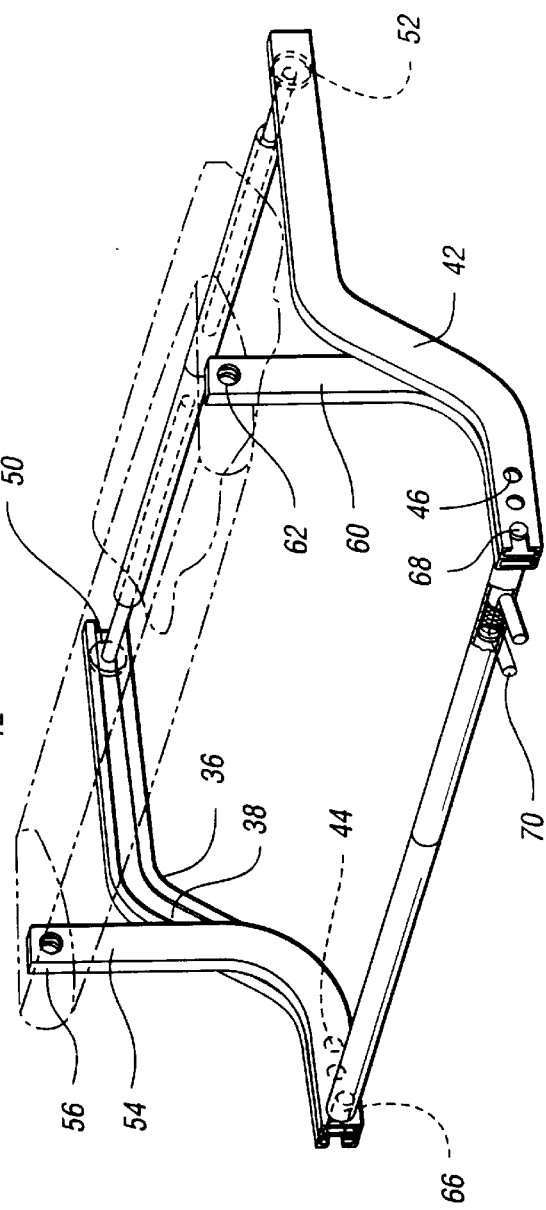

ROLLING STOWABLE SEAT

TECHNICAL FIELD

The present invention relates to a stowable vehicle seat.

BACKGROUND OF THE INVENTION

Passenger cars and trucks are used for transporting passengers and cargo. Passenger seats in vehicles limit the cargo carrying capacity of the vehicle. Minivans and sport utility vehicles have various configurations of passenger seats that are adapted to be converted from a passenger seat to a folded cargo carrying position. Generally, the seat back folds down over the lower seat. While this creates additional cargo carrying capacity, the folded seat back may be a foot to a foot and a half above the floor of the passenger/cargo compartment.

Another approach to the problem of maximizing cargo carrying capacity in a minivan or sport utility vehicle is to provide detachable seats that can be removed from the vehicle leaving a clear, unobstructed cargo floor of maximum height. Conventional seats suffer from the disadvantage that they are heavy and unwieldy. Also, after the seats are removed from the vehicle, they must be stored outside the vehicle typically in an already crowded garage.

Yet another approach is to provide seats that are mounted to the floor of a vehicle on rollers that are received in tracks secured to the floor of the vehicle. In this approach, the seats may be either rolled forwardly or rearwardly in the vehicle so that they are adjacent to one another when folded down. Also, one or more rows of seats may be removed. Depending on whether the seats are left in the vehicle in a folded down condition or removed, this approach suffers from the same disadvantages that were previously described.

The present invention is directed to solving the above problems.

SUMMARY OF THE INVENTION

The present invention provides a vehicle seat for a vehicle, such as a minivan or sport utility vehicle, that may be folded down and rolled into a recess formed in the floor of the vehicle to provide a full height cargo area of maximum cargo carrying capacity.

According to the present invention, a seat is provided for a vehicle that has a compartment that may be arranged in a passenger configuration or a cargo carrying configuration. The floor of the compartment defines a recess in which the seat may be wholly or partially stowed. Rear wheel housings extend into the compartment on opposite sides of the floor. The seat includes a lower seat assembly and a seat back assembly that are pivotally connected. Rails defining channels are secured to the wheel housings on opposite sides of the compartment. Shiftable elements, or rollers, are connected to the rear portion on opposite sides of the lower seat assembly and are received in the channels defined by the rails. Link arms are pivotally connected to the front portion of the lower seat and are also pivotally connected to the floor. Locking pins associated with the link arms are provided to selectively lock the shiftable elements to the rails. The seat is converted from the passenger configuration to the cargo carrying configuration by pivoting the seat back onto the lower seat, disengaging the locking pins from the rails, and shifting the lower seat forward by moving the shiftable elements in the channels and pivoting the link arms forward and downward until the lower seat is received in whole or in part in the recess formed in the floor of the vehicle.

According to another aspect of the invention, the rails may be provided with a series of holes spaced along a portion of their lengths. The right and left locking pins may be selectively received in corresponding holes in the rails to permit adjustment of the seat fore and aft. The locking pins may be secured to the link arms with a lever arm or other actuator connected to the locking pins for extending or retracting the locking pins.

According to another aspect of the invention, a rear surface of the seat back is oriented in a substantially horizontal plane when the seat is in the cargo carrying configuration. Provided that the recess in the floor of the vehicle is large enough to accommodate the lower seat and seat back, the rear surface of the seat back may form a continuous surface with the floor of the compartment.

These and other advantages and objects of the present invention will be better understood in view of the attached drawings and the following detailed description of the invention.

BRIEF DESCRIPTION OF THE DRAWINGS

FIG. 3 is a side elevation view of a vehicle showing seats made in accordance with the present invention and showing the seats in a progression of positions between the passenger configuration and cargo carrying configuration.

FIG. 4 is a fragmentary perspective view of the rails, pivoting links, and shiftable elements made in accordance with the present invention.

BEST MODE FOR CARRYING OUT THE INVENTION

Figure 1:
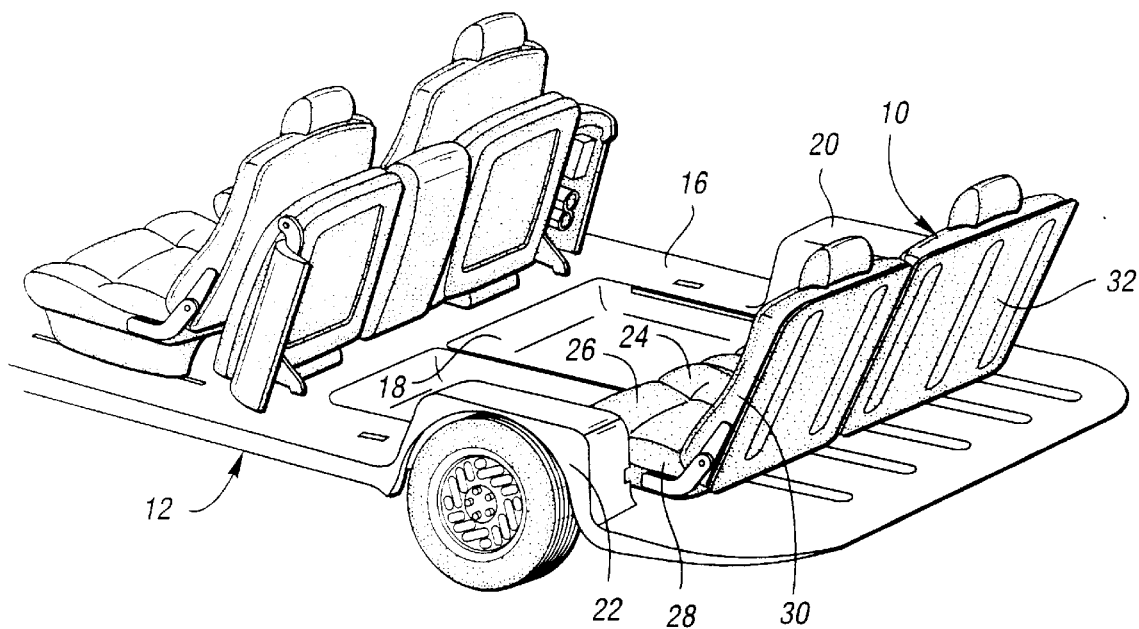
FIG. 1 is a fragmentary perspective view of the passenger compartment of a vehicle with rear seats in a passenger configuration.

Referring now to FIG. 1, a seat 10 for a vehicle 12 having a compartment that is converted between a passenger configuration and a cargo carrying configuration is shown. The compartment has a floor 16 that defines a recess 18. The floor 16 is flanked by a right wheel housing 20 and a left wheel housing 22.

The seat 10 is formed by a lower seat assembly 24 having a front portion 26 and a rear portion 28 and a seat back assembly 30 that is pivotally connected to the lower seat assembly 24. The lower seat assembly 24 and seat back assembly 30 are of conventional design including a frame and foam bun that are enclosed in seat covers. Seat back assembly 30 has a rear surface 32 that is oriented in a substantially horizontal plane when the seat is in the cargo carrying configuration. The rear surface 32 is preferably generally planar in shape so that it is generally coplanar with the floor 12.

Figure 2:
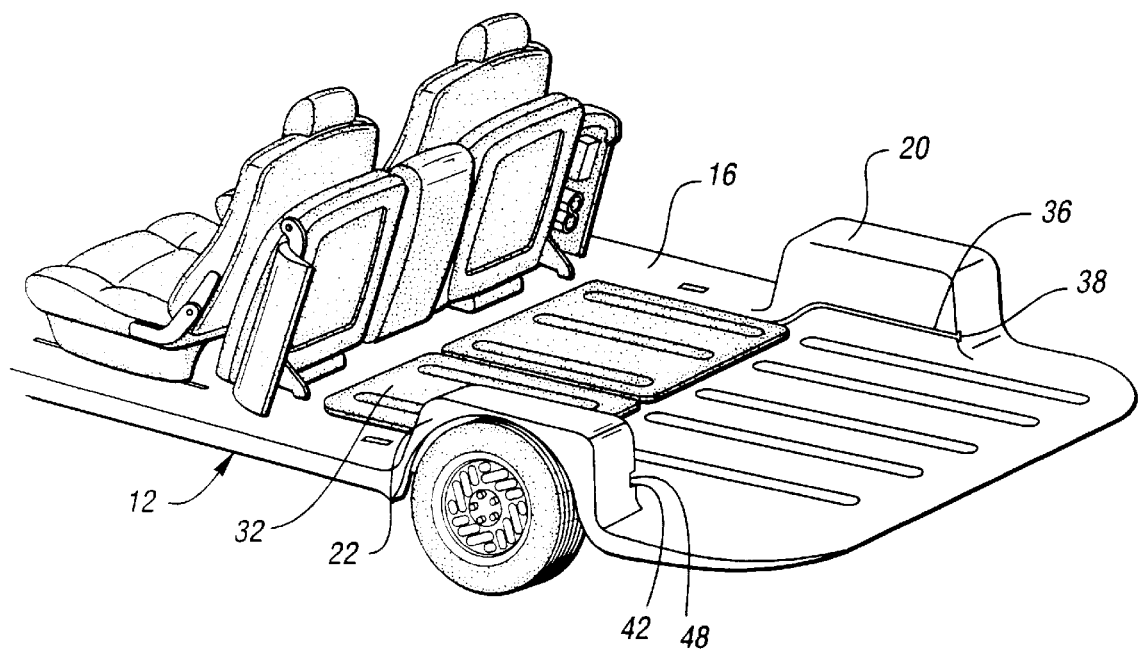
FIG. 2 is a fragmentary perspective view of the passenger compartment of a vehicle with the rear seats in a cargo carrying configuration.

As shown in FIGS. 2 and 4, a right rail 36 is secured to the right wheel housing 20. The right rail 36 defines a first channel 38. First channel 38 is a box channel having an opening in one side. Left rail 42 is secured to the left wheel housing 22 and defines a second channel 48 which is similar to first channel 38. Right rail 36 and left rail 42 are provided with a series of holes 44 and 46 that are spaced along a portion of their length corresponding to a generally horizontally extending portion of the rails.

A right side shiftable element 50, or roller, is connected to the rear portion 28 of the lower seat assembly 24. Right side shiftable element 50 is received in the first channel 38 of the right rail 36 for movement within or along the first channel 38. The right side shiftable element 50 is preferably a roller but may be of a non-cylindrical configuration that is slidable within the first channel 38. Alternatively, the shiftable element could be a telescopic member received within the channel 38 in which case it would be necessary to angle the channel 38 from the high point at its rear to the level of the floor 16.

A left side shiftable element 52, or roller, is connected to the rear portion 28 of the lower seat assembly 24 and is received in the second channel 48 of the left rail 42 for movement along the second channel 48. The alternative embodiments described in reference to the right side shiftable element 50 are equally applicable to the left shiftable element 52.

A right link arm 54 is pivotally connected on an upper end 56 to the front portion 26 of the lower seat assembly 24. Right link arm 54 is also pivotally connected to the floor 16. A left link arm 60 is similarly pivotally connected on an upper end 62 to the front portion 26 of the lower seat assembly 24 and pivotally connected to the floor 16. Right and left link arms 54 and 60 may be provided in a single unit by providing converging link arms or by providing a plate which serves the equivalent function and would be pivotally connected to both the front portion 26 of the lower seat assembly 24 and the floor 16.

A right locking pin 66 associated with the right link arm 54 selectively locks the right link arm 54 to the right rail 36. A left locking pin 68 associated with the left link arm 60 is provided to selectively lock the left link arm 60 to the left rail 42. Right and left locking pins 66 and 68 are selectively received in corresponding holes 44 and 46 in the right and left rails 36 and 42 to permit adjustment of the position of the seat fore and aft.

An actuator 70 is secured to the right and left locking pins 66 and 68. The actuator is actuated to extend and retract the right and left locking pins 66 and 68 relative to the right and left link arms 54 and 60.

To convert the seat from the passenger configuration to the cargo carrying configuration, first, seat assembly 30 is pivoted onto the lower seat assembly 24. Right and left locking pins 66 and 68 are disengaged from right and left rails 36 and 42, respectively, and lower seat assembly 24 is shifted forward by moving right and left side shiftable elements 50 and 52 forward in first and second channels 38 and 48, respectively. The upper ends 56 and 62 of right and left link arms 54 and 60 are pivoted forwardly and downwardly until the lower seat assembly 24 is received in the recess 18 formed in the floor 16 of the vehicle 12.

The seat may be converted from the cargo carrying configuration to the passenger configuration by lifting the lower seat assembly 24 with the seat back assembly 30 folded over it from the recess 18. Right and left link arms 54 and 60 are pivoted upwardly and rearwardly while right and left side shiftable elements 50 and 52 are shifted rearwardly in first and second channels 38 and 48, respectively. Right and left locking pins 66 and 68 are received in the holes 44 and 46 in right and left rails 36 and 42 to lock the right and left link arms 54 and 60 in place in the channels. Preferably, a series of holes 44 and 46 are provided in the right and left rails 36 and 42 to permit adjustment of the position of the seat fore and aft. The seat back assembly 30 is then pivoted to its upright position relative to the lower seat assembly 24.

Depending upon the depth of the recess 18 relative to the floor 16, the lower seat assembly 24 and seat back assembly 30 may be either fully disposed in the recess 18 or partially disposed in the recess 18 in the cargo carrying configuration.

For convenience, an actuator 70 is secured to right and left locking pins 66 and 68. Actuator 70 is preferably a spring-biased member that is connected to both the right and left locking pins 66 and 68 so that only one actuator 70 must be actuated to extend and retract both right and left locking pins 66 and 68.

The preceding description of the best mode of carrying out the invention is provided by way of example and should not be read in a limiting sense. The broad scope of the present invention should be construed in accordance with the following claims.

What is claimed is:

1. A seat mounted within a vehicle having a compartment that is converted between a passenger configuration and a cargo carrying configuration, the compartment having a floor that defines a recess and a right wheel housing and a left wheel housing on opposite sides of the floor, said seat comprising:

a lower seat assembly having a front portion and a rear portion;

a seat back assembly pivotally connected to the lower seat assembly;

a right rail secured to the right wheel housing, said right rail defining a first channel;

a left rail secured to the left wheel housing, said left rail defining a second channel;

a right side shiftable element connected to the rear portion of the lower seat assembly and received in the first channel of the right rail for movement along the first channel;

a left side shiftable element connected to the rear portion of the lower seat assembly and received in the second channel of the left rail for movement along the second channel;

a right link arm pivotally connected on an upper end to the front portion of the lower seat assembly and pivotally connected to the floor;

a left link arm pivotally connected on an upper end to the front portion of the lower seat assembly and pivotally connected to the floor;

a right locking pin associated with the right link arm that selectively locks the right link arm to the right rail;

a left locking pin associated with the left link arm that selectively locks the left link arm to the left rail;

said seat being converted from the passenger configuration to the cargo carrying configuration by pivoting the seat back assembly onto the lower seat assembly, disengaging right and left locking pins from the right and left rails, respectively, shifting the lower seat assembly forward by moving the right and left side shiftable elements forward in the first and second channels, respectively, and pivoting the upper ends of the right and left link arms forward and downward until the lower seat assembly is received in the recess formed in the floor of the vehicle.

2. The seat of claim 1 wherein said shiftable elements are rollers.

3. The seat of claim 1 wherein right and left rails have a series of holes spaced along a portion of their length, and said right and left locking pins being selectively received in corresponding holes in the right and left rails to permit adjustment of the position of the seat fore and aft.

4. The seat of claim 1 wherein the seat back assembly has a rear surface that is oriented in a substantially horizontal plane when the seat is in the cargo carrying configuration.

5. The seat of claim 1 wherein the right and left locking pins extend from the right and left link arms.

6. The seat of claim 1 further comprising an actuator connected to the right and left locking pins that is actuated to extend and retract the right and left locking pins.

* * * * *